United States Patent

Kumashiro

[11] Patent Number: 6,115,504
[45] Date of Patent: Sep. 5, 2000

[54] IMAGE PROCESSING APPARATUS EMPLOYING ERROR DIFFUSION TYPE BINARIZING SYSTEM

[75] Inventor: Hideo Kumashiro, Fukuyama, Japan

[73] Assignee: Minolta Co., Ltd., Osaka, Japan

[21] Appl. No.: 08/531,161

[22] Filed: Sep. 19, 1995

Related U.S. Application Data

[63] Continuation of application No. 08/195,159, Feb. 10, 1994, abandoned.

[30] Foreign Application Priority Data

Feb. 16, 1993 [JP] Japan .................................. 5-026502

[51] Int. Cl.[7] ...................................................... G06K 9/38
[52] U.S. Cl. ........................... 382/273; 358/455; 358/466
[58] Field of Search .................................... 382/270, 273; 358/454–457, 465, 466, 534

[56] References Cited

U.S. PATENT DOCUMENTS

| | | | |
|---|---|---|---|
| 4,958,238 | 9/1990 | Katayama et al. | 358/456 |
| 4,975,786 | 12/1990 | Katayama et al. | 358/457 |
| 5,045,952 | 9/1991 | Eschbach | 358/455 |
| 5,060,284 | 10/1991 | Klees | 382/53 |
| 5,068,746 | 11/1991 | Ohsawa et al. | 382/54 |
| 5,077,812 | 12/1991 | Kanno et al. | 382/50 |
| 5,307,425 | 4/1994 | Otsuka | 358/465 |
| 5,307,426 | 4/1994 | Kanno et al. | 358/456 |

FOREIGN PATENT DOCUMENTS

| | | |
|---|---|---|
| 63-214073 | 9/1988 | Japan . |
| 3-129972 | 6/1991 | Japan . |

*Primary Examiner*—Christopher S. Kelley
*Attorney, Agent, or Firm*—Sidley & Austin

[57] ABSTRACT

Digital image data read in by an image scanner is added with a binary error calculated by a peripheral error weighting filter in an error adder to correct binary error. The corrected data is compared with a predetermined threshold value $T_0$ by a comparator provide output as binary data. A binary error calculation unit calculates a binary error according to the output binary data and error correction data, which is fed back to the digital image data. A variable base value calculation unit for providing to the binary error calculation unit a base value to calculate calculation error and a maximum value/minimum value detection unit are provided outside the feedback loop.

12 Claims, 5 Drawing Sheets

IMAGE PROCESSING APPARATUS EMPLOYING ERROR DIFFUSION TYPE BINARIZING SYSTEM

This application is a continuation of application Ser. No. 08/195,159, filed Feb. 10, 1994 now abandoned.

BACKGROUND OF THE INVENTION

1. Field of the Invention

The present invention relates to image processing apparatus, and more particularly to an image processing apparatus employing an error diffusion type binarizing system.

2. Description of the Related Art

In the field of image processing apparatus, an error diffusion system is known as a binarizing system that allows coexistence of gradation and resolution. Many systems have been proposed to improve the coexistence of gradation and resolution even in a mixed text/picture image by combining a region determination process and the error diffusion system.

One such proposal, for example, is disclosed in Japanese Patent Laying-Open No. 63-214073. An error calculation unit of an image processing apparatus disclosed in the Laid-Open application is shown in FIG. 6.

Figure 6:
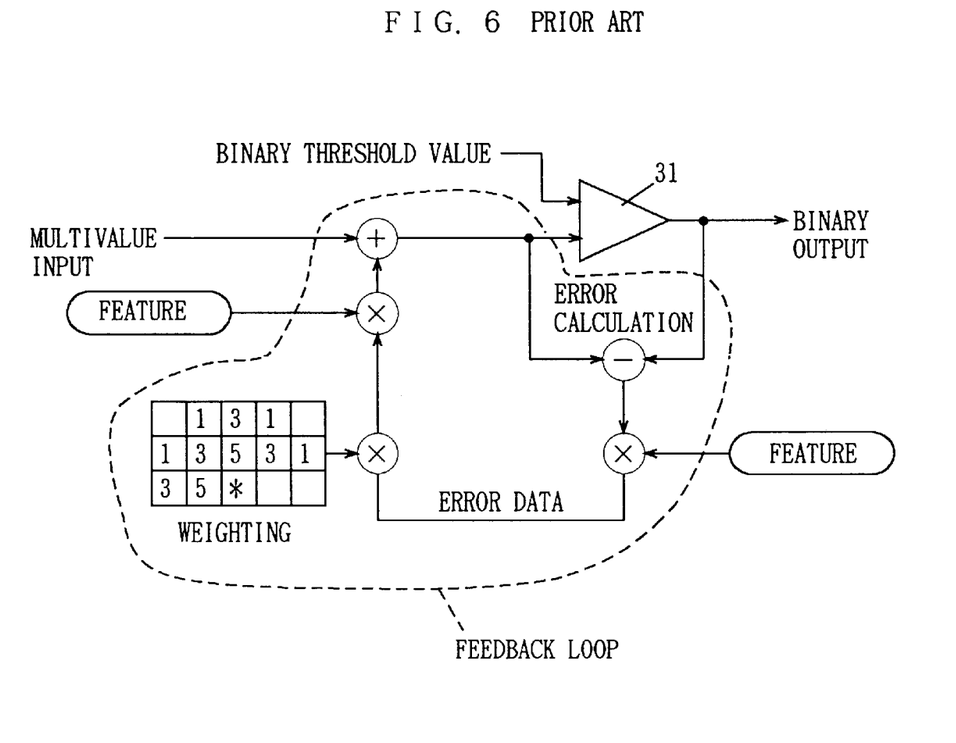
FIG. 6 is a block diagram showing the main part of a conventional image processing apparatus.

Referring to FIG. 6, multivalue input data is added with a binary error of a peripheral pixel and then binarized by a comparator 31. If the error added data is equal to or greater than a binary threshold value, "1" is provided as a binary output value. If the error added value is smaller than the binary threshold value, "0" is provided. By this process, binary error data of a target pixel is propagated to subsequent pixels, whereby a density retaining type binarization is carried out. In FIG. 6, a multiplier is provided within the feedback loop to apply a gain operation on a calculated error depending upon the feature of an image. For example, the gain is set as gain=0 for an image of text, gain=0.5 for an image of mixed text and pictures, and gain=1 for an image of a picture.

The conventional image processing apparatus shown in FIG. 6 had a problem that the propagation of a binary error is increased since a binary error calculation base value is fixed independent of the density of the image of an original.

Furthermore, it is difficult to speed up the operation of an error diffusion system employed in a conventional image processing apparatus. This is because an error diffusion system is implemented with asynchronous circuitry including a feedback loop. An error diffusion circuit has its operation speed limited according to the delay time of this feedback loop. Because an adaptation process for region determination is provided in the feedback loop as shown in FIG. 6, the operation speed is reduced in carrying out a process with high accuracy. In contrast, if the operation speed is increased, the accuracy is reduced.

SUMMARY OF THE INVENTION

In view of the foregoing, an object of the present invention is to minimize propagation of a binary error in an image processing apparatus that binarizes multivalue image data.

Another object of the present invention is to allow processing with high accuracy and high operation speed in an image processing apparatus that binarizes multivalue image data.

A further object of the present invention is to improve accuracy and operation speed in an image processing apparatus that binarizes multivalue image data employing an error diffusion system.

Still another object of the present invention is to provide an image processing method of high accuracy and operation speed in an image processing apparatus that binarizes multivalue image data using an error diffusion system.

The above objects of the present invention are achieved by an image processing apparatus that binarizes multivalue image data according to an error diffusion system and includes the elements set forth below. More specifically, in an image processing apparatus that binarizes multivalue image data according to the present invention, maximum and minimum values of density are detected from image data of a plurality of pixels including a target pixel to calculate a base value according to the detected values, whereby diffusing a binary error is carried out according to the base value. Because a binary error calculation base value is calculated on the basis of density data of an image of an original, a binary error calculation base value which was conventionally fixed can be varied according to the feature of an original. As a result, propagation of a binary error can be reduced.

According an another aspect of the present invention, an image processing apparatus using an error diffusion system includes a detector for detecting the density of a plurality of pixels including a target pixel. The maximum density, the minimum density, and the maximum difference in density of a pixel are obtained according to the pixel density detected by the detector, whereby a base value is calculated. The image processing apparatus calculates a binary error using the calculated base value, whereby a feed back is carried out on the target pixel according to the calculated error data.

The maximum difference-in-density calculation and the base value calculation are carried out outside the feedback loop. Because the base value is calculated according to a detected image density, the base value can be varied according to the feature of the image. Furthermore, because the calculation of the maximum difference-in-density and calculation of a base value are carried out outside the feedback loop, an image processing apparatus using an error diffusing system is provided with high accuracy and high operation speed.

The conventional image processing apparatus shown in FIG. 6 had a problem that propagation of a binary error is increased since a binary error calculation base value is fixed independent of the density of the image of an original.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

Figure 1:
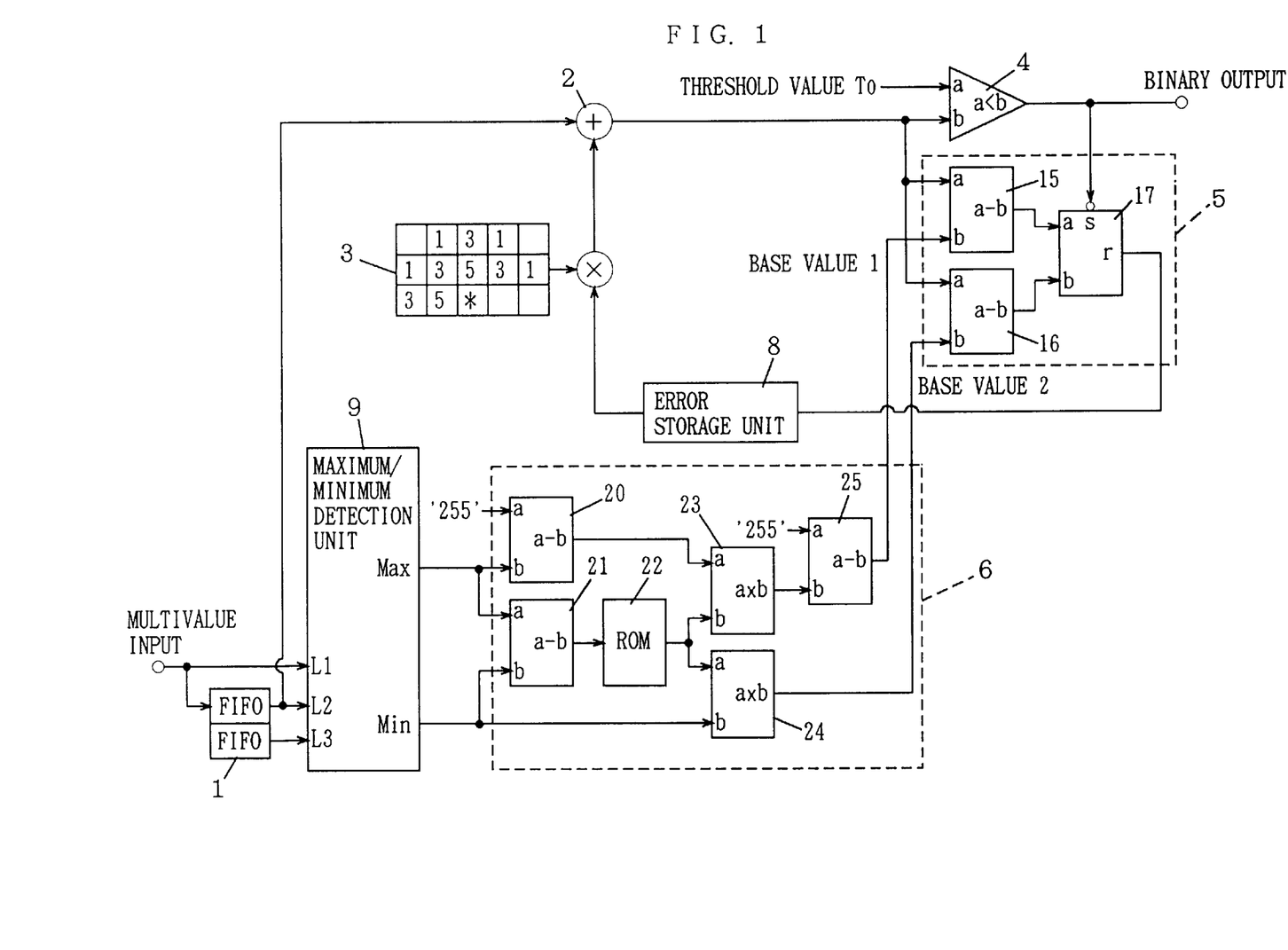
FIG. 1 is a block diagram showing the main part of an image processing apparatus according to the present invention.

Referring to FIG. 1, an error diffusion binarizing circuit of an image processing apparatus according to the present invention includes a FIFO (First In First Out) unit 1 for receiving digital image data read in by an image scanner not shown, an error adder 2 connected to FIFO unit 1, a peripheral error weighting filter 3 for providing data to error adder 2 for adding a binary error, a comparator 4 connected to error adder 2 for comparison with a threshold value, whereby binary data is provided, a binary error calculation unit 5 for calculating a binary error, an error storage unit 8 for storing binary error data from binary error calculation unit 5, a maximum value/minimum value detection unit 9, and a variable base value calculation unit 6. Maximum value/minimum value detection unit 9 and variable base value calculation unit 6 are connected to FIFO unit 1 to provide a base value to binarize error calculation unit 5 for a binary error calculation.

Two lines of multivalue digital image data are stored in FIFO unit 1. They are used to form a 3×3 matrix window with a currently read out one line. This 3×3 window is used in maximum value/minimum value detection unit 9 described below.

Error adder 2 adds the aforementioned digital image data and a binary error calculated by peripheral error weighting filter 3 to correct a binary error. The corrected error correction image data is compared with a threshold value $T_0$ in comparator 4 to be binarized.

If the error correction image data is greater than or equal to $T_0$, "1" is provided as a binary output, otherwise "0" is provided. If the binary output is "1", a dot is printed in an image formation apparatus such as a printer not shown. A dot is not printed if the binary output value is "0".

Binary error calculation unit 5 includes first and second error calculators 15 and 16 for receiving error correction image data and data from variable base value calculation unit 6, and a selector connected to first and second error calculators 15 and 16. First error calculator 15 functions to calculate an error value when a dot is printed, and provides data having a variable base value 1 subtracted from the error correction image data. Second error calculator 16 functions to calculate an error value when a dot is not printed, and provides data having a variable base value 2 subtracted from the error correction image data. Selector 17 is a select circuit for selecting a calculated value from first error calculator 15 and second error calculator 16 when comparator 4 provides "1" and "0", respectively.

Three lines of a binary error calculated by binary error calculation unit 5 are held by error storage unit 8 to be given weight by peripheral error weighting filter unit 3 of a 5×3 matrix. By these series of circuits, a binary error is diffused to carry out a density retaining type area gradation.

The variable base value calculating unit 6 will be described below. A maximum value Max and a minimum value Min within a 3×3 matrix window are detected by maximum value/minimum value detection unit 9. The digital image read into this 3×3 matrix window corresponds to the density of each pixel. Many methods of detecting a maximum value and a minimum value are already proposed in the prior art, and their description will not be provided herein.

Variable base value calculation unit 6 includes a first difference calculator 20 for calculating the difference between a maximum image density data of "255" represented by 8 bits and a Max, a second difference calculator 21 for calculating the difference between a Max and a Min, a ROM table 22 connected to second difference calculator 21, a first product calculator 23 connected to first difference calculator 20 and ROM table 22 for calculating the product of the respective outputs, a second product calculator 24 for calculating the product of an output of ROM table 22 and a Min for providing a base value 2, and a third difference calculator 25 for calculating a difference between a value of "255" and an output from first product calculator 23 to provide a base value 1.

Equations for calculating variable base values 1 and 2 according to Max and Min values in variable base value calculation unit 6 will be described hereinafter.

$$\text{Base Value } 1 = 255 - (255 - \text{Max}) \times k \qquad (1)$$

$$\text{Base Value } 2 = \text{Min} \times k \qquad (2)$$

where $$k = (\text{Max} - \text{Min})/C \text{ ($C$ is a constant, if Max} - \text{Min} > C \text{ then } k=1) \qquad (3)$$

First difference calculator 20, first product calculator 23, and third difference calculator 25 calculate 255−(255−Max)×k in equation (1).

Second product calculator 24 calculates Min×k in equation (2).

Second difference calculator 21 calculates Max−Min in equation (3).

ROM table 22 calculates (Max−Min)/C in equation (3).

Thus, variable base values 1 and 2 are calculated to be used in the above-described binary error calculation unit 5.

Figure 2:
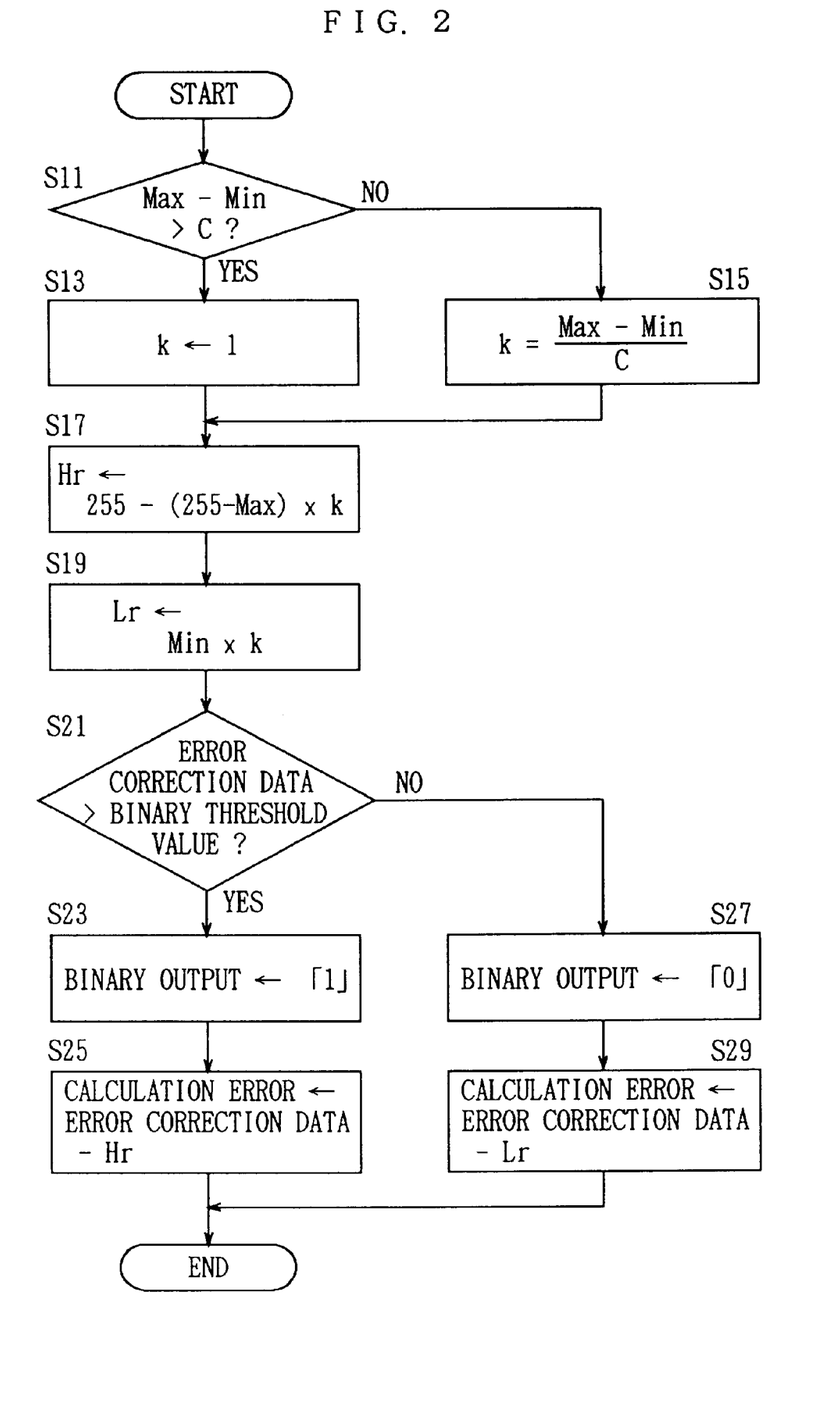
FIG. 2 is a flow chart showing an algorithm of an image processing apparatus according to the present invention.

The algorithm of the operation carried out in the circuit described with reference to FIG. 1 will be described below with reference to the flow chart of FIG. 2. At step S11 ('step' omitted hereinafter), a determination is made as to whether Max−Min is greater than a constant C. If YES at S11, 1 is substituted for k in equation (3)(S13). Otherwise, k=(Max−Min)/C(S15).

Using this value of k, equations (1) and (2) are calculated to obtain binary base values 1 (Hr) and 2 (Lr) (S17, S19).

The error correction image data provided from error adder 2 and binary threshold value $T_0$ are compared by comparator 4 (S21). If a determination is made that the error correction image data is equal to or greater than binary threshold value $T_0$, a "1" is provided as a binary output, and "error correction image data—Hr" is provided as a calculated error from binary error calculation unit 5 (S23, S25). If the result of the comparison is NO at S21, a "0" is provided as a binary output, and "error correction image data—Lr" is provided as a calculated error from binary error calculation unit 5 (S27, S29).

Figure 3:
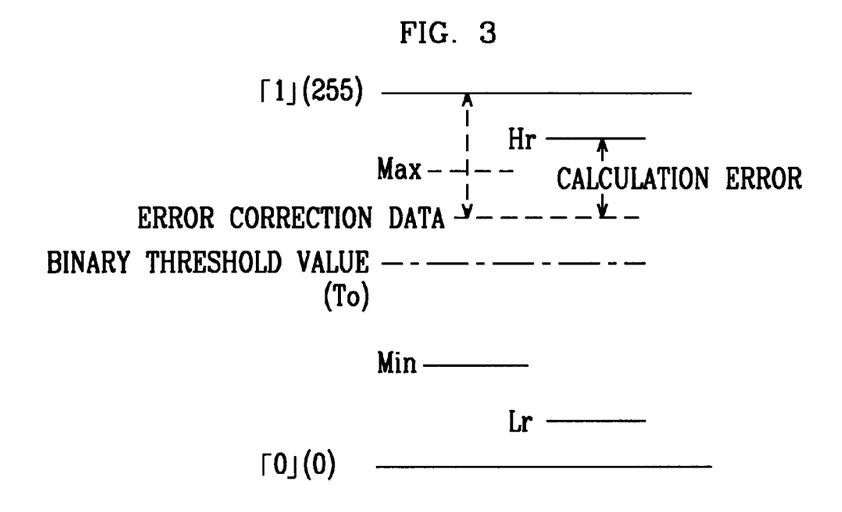
FIG. 3 is a diagram showing the specific meaning of an operation of a binary error calculation unit.

A data process when of YES at S21 in FIG. 2 will be described below with reference to FIG. 3. FIG. 3 indicates the relationship of binary outputs "1" and "0", binary threshold value $T_0$, error correction image data, Max, Min, Hr and Lr.

Referring to FIG. 3 showing a case where the error correction data is greater than binary threshold value $T_0$, the calculated error provided from binary error calculation unit 5 is represented by the difference between the error correction image data and Hr corresponding to binary base value 1. In conventional cases where the base value was fixed, the difference indicated by a double ended arrow of a broken line corresponds to the calculated error. According to the invention, a base value which was conventionally fixed approximates the value of error correction image data, whereby the binary error approaches 0. This means that propagation of an error is reduced. In other words, error propagation can be controlled by shifting the base value. This will be described in detail below.

Determination of coefficient k, i.e. an example of forming ROM table 22, will first be described.

(i) k=0

In this case, equations (1) and (2) become:

Variable base value 1=255−(255−Max)*0=255

Variable base value 2=Min*0=0

Thus, an error is propagated as in a general diffusion binarizing system.

(ii) k=1

In this case, equations (1) and (2) become:

Variable base value 1=255−(255−Max)*1=Max

Variable base value 2=Min*1=Min

This case will be described below for originals of images of text and pictures.

(a) Text Original

Figure 4A:
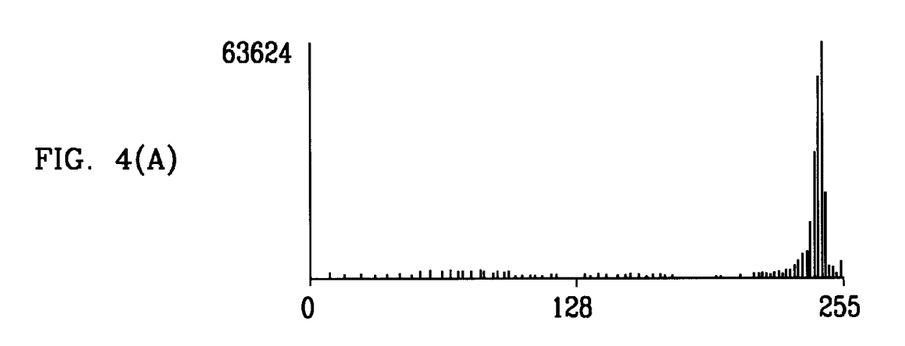
FIG. 4 is a graph showing the results of applying a density histogram measurement on a typical text image and a picture image.
Figure 4B:
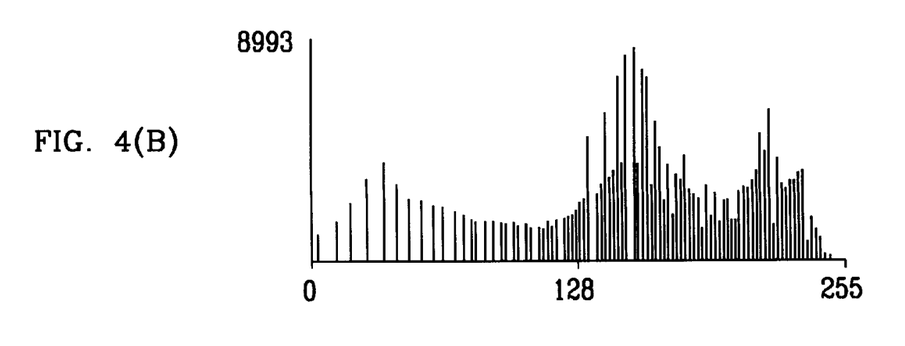

FIG. 4 shows the results of density histogram measurement on an entire image for a typical text image and a typical picture image (facsimile text chart). (A) corresponds to a text original, and (B) corresponds to a picture original. The size of an image area is 512×512. The density value is plotted along the abscissa and the appearance frequency is plotted along the ordinate.

Referring to FIG. 4 (A), the density distribution is substantially bipolarized in a text original. Bipolarization of the density distribution implies that all the pixel values within a window are likely to belong to either a Max value or a Min value in a text original. This means that a target pixel image data value to be binarized is very close to either a Max or a Min (i.e. very close to a base value). Considering that calculation of a binary error is:

(binary error)=(image data+peripheral error)−(base value)

and that a peripheral error is approximately 0 in a text region, little if any binary error is generated in a text original. Therefore, there is no propagation of an error. This is equal to carrying out a simple binarization.

(b) Picture Original

In a picture original, the density distribution is substantially scattered as shown in FIG. 4(B). The value of a target pixel image data to be currently binarized rarely equals a base value. On the other hand, an image data value will not differ greatly from a base value since there is no significant change in value within a matrix window in a picture original. Therefore, propagation of an error is, though not 0, greatly reduced in comparison with the case where k=0.

From the foregoing, it can be appreciated that an image can be obtained substantially equal to that of a simple binarization when k=1.

The difference in behavior of binarization in the extremes of k=0 and k=1 has been described. By altering continuously the variable of k from 0 to 1, continuous adjustment can be made from a general error diffusion applicable to binarization of a picture image to a simple binarization applicable to binarization of a text image, as set forth in the following.

(iii) k=(Max−Min)/C

Figure 5:
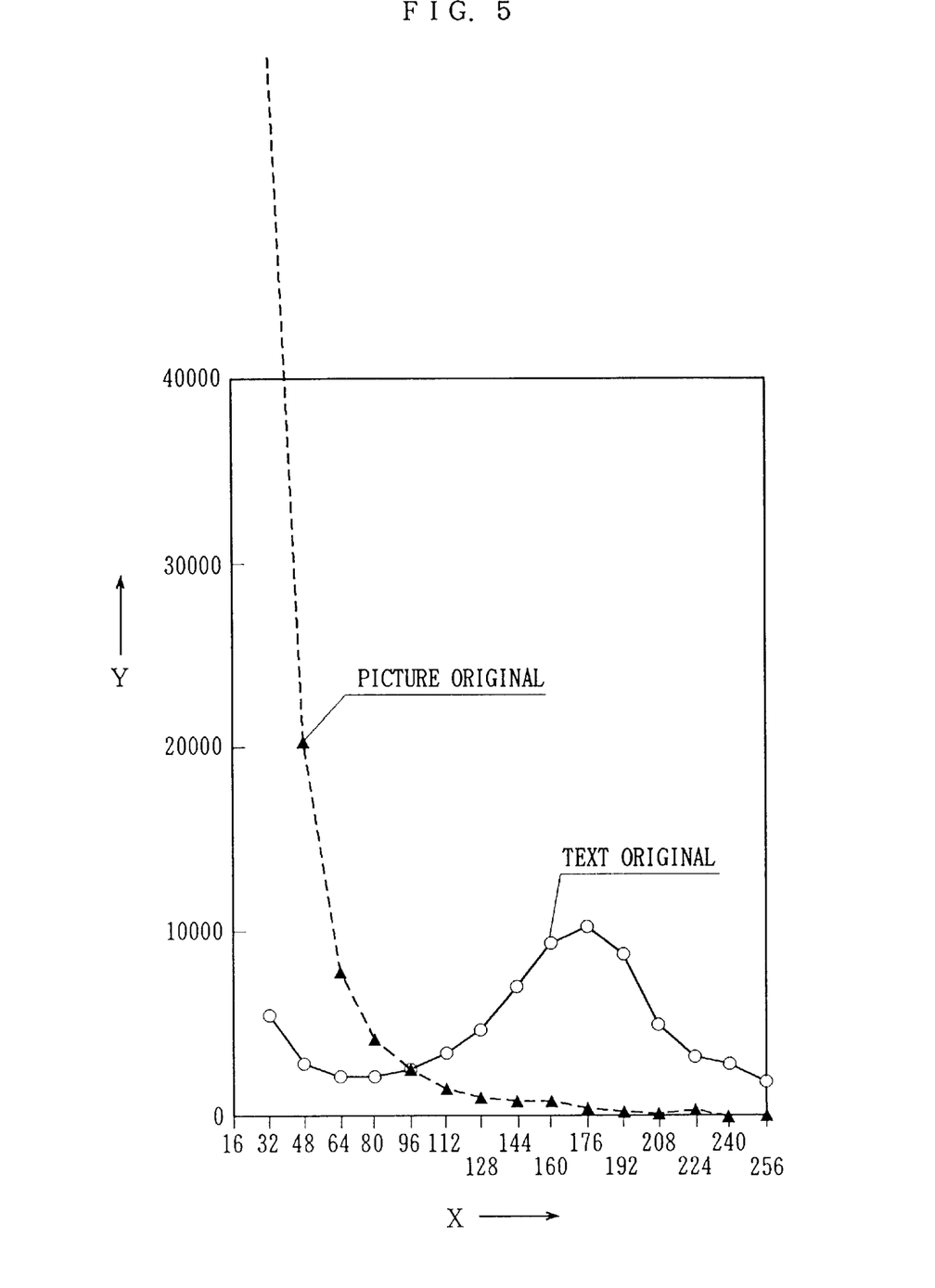
FIG. 5 is a graph showing the results of carrying out maximum value/minimum value detection on a facsimile text chart with a 5×5 matrix window.

FIG. 5 shows the results of maximum value/minimum value detection in a 5×5 matrix window for a typical text image and a picture image (facsimile text chart). The image area size is 512×512. The Max−Min value is plotted along the abscissa and the appearance frequency is plotted along the ordinate.

It can be appreciated from FIG. 5 that the appearance frequency is greatly inverted between a text original and a picture original at the boundary of Max−Min value=96. More specifically, if determination is made that a value smaller than 96 is a picture region and a value greater than 96 is a text region where k=0 and k=1, respectively, an original adaptive binarization can be realized with coexistence of gradation and resolution because general error diffusion is carried out in a picture region and simple binarization is carried out in a text region. However, a determination process simply based on different levels of threshold values will lead to erroneous determination in regions where difference is not so definite as in the threshold levels of 64–128, resulting in an unnatural picture quality.

By taking advantage of the fact that a Max−Min value is high in a text region and low in a picture region to prepare a ROM table in which the value of k changes continuously as a variable that is proportional to Max−Min, a natural process can be realized in a boundary region of a text and a picture where the difference thereof cannot be made easily.

From the result of FIG. 5, let:

$C=96*2=192$ then $k=(Max-Min)/192$ (Note $k=1$ when Max−Min>202).

When Max−Min=96, i.e. in a boundary region where identification of whether a text or a picture cannot be made, k=0.5 is established to realize a process where reproduction of both a text and a picture are in balance.

Although the binary base value is shifted to Max or Min in the above-described embodiment, the base value may be shifted to an average density within the window. Alternatively, the base value may be shifted to a target pixel value prior to error correction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for binarizing multi-value image data by an error diffusion system, said error diffusion system comprising:

binarizing means for comparing incoming image data of a target pixel with a predetermined value for binarization;

detecting means for detecting a maximum value and a minimum value of a pixel density from image data of a plurality of pixels and from said incoming target pixel;

base value calculation means for calculating a base value in proportion to a difference between said maximum value and said minimum value detected by said detection means;

error calculation means for calculating a binary error by subtracting from the image data of the incoming target pixel said calculated base value according to an output value of said binarizing means; and means for diffusing said calculated binary error to a peripheral pixel of said incoming target pixel.

2. An image processing apparatus for binarizing multi-value image data by an error diffusion system, said error diffusion system comprising:

binarizing means for comparing incoming image data of a target pixel with a predetermined value for binarization;

detecting means for detecting a maximum value and a minimum value of a pixel density from image data of a plurality of pixels and from said incoming target pixel;

base value calculation means for calculating a base value in proportion to a difference between said maximum value and said minimum value detected by said detecting means;

error calculation means for calculating a binary error by subtracting from the image data of the incoming target pixel said calculated base value according to an output value of said binarizing means; and means for diffusing said calculated binary error to a pixel peripheral to said incoming target pixel, wherein said base value calculation means calculates a first base value and a second base value, and wherein said binary error calculated by said error calculation means is a difference between said first base value and the image data of said incoming target pixel when the image data of said incoming target pixel is equal to or greater than said predetermined value, and said binary error is a difference between said second base value and the image data of said incoming target pixel when the image data of said incoming target pixel is smaller than said predetermined value.

3. The image processing apparatus according to claim 2, wherein said first base value and said second base value are calculated by said base value calculation means in accordance with the following expressions;

First base value=$A-(A-MAX) \times K$

Second base value=$MIN \times K$ where $K=(MAX-MIN)/C$, if MAX−MIN>C then $K=1$ wherein A: Upper limit density represented by multivalue image data MAX: Maximum value detected by said detecting means MIN: Minimum value detected by said detecting means C: Predetermined constant value.

4. The image processing apparatus according to claim 2, wherein said first base value approximates said maximum value and said second base value approximates said minimum value in proportion to a greater difference between said maximum value and said minimum value.

5. The image processing apparatus according to claim 1, wherein said error calculation means is arranged in parallel with said binarizing means.

6. An image processing apparatus for binarizing multi-value image data by an error diffusion system, said error diffusion system comprising:

binarizing means for comparing image data of a target pixel incoming to said error diffusion system with a predetermined value for binarization;

determining means for determining whether incoming image data to be binarized by said binarizing means represent a photographic image or a character image;

base value calculation means for calculating a base value in accordance with the determination of said determining means;

error calculation means for calculating a binary error by subtracting from the image data of the incoming target pixel said calculated base value according to an output value of said binarizing means; and means for diffusing said calculated error to a peripheral pixel of said incoming target pixel.

7. The image processing apparatus according to claim 6, wherein said determining means includes detection means for detecting a maximum value and a minimum value of a pixel density from image data of a plurality of pixels including said target pixel, and difference calculation means for calculating a difference between said maximum value and said minimum value, and said determining means determines a photographic image or a character image based on said difference calculated by said difference calculation means.

8. An image processing apparatus for binarizing multi-value image data by an error diffusion system, said error diffusion system comprising;

binarizing means for comparing image data of a target pixel incoming to said error diffusion system with a predetermined value for binarization;

determining means for determining whether incoming image data represents a photographic image or a character image;

base value calculation means for calculating a base value in accordance with the determination of said determining means;

error calculation means for calculating a binary error by subtracting from the image data of the incoming target pixel said calculated base value according to an output value of said binarizing means; and means for diffusing said calculated error to a pixel peripheral to said incoming target pixel, wherein said base value calculation means calculates a first base value and a second base value, and wherein said binary error is a difference between said first base value and the image data of said target pixel when the image data of said target pixel is equal to or greater than said predetermined value, and said binary error is a difference between said second base value and the image data of said target pixel when the image data of said target pixel is smaller than said predetermined value.

9. An image processing apparatus for binarizing multi-value image data by an error diffusion system, said error diffusion system comprising:

binarizing means for comparing image data of a target pixel incoming to said error diffusion system with a predetermined value for binarization;

detecting means for detecting a pixel density from image data of a plurality of pixels and said incoming target pixel;

base value calculation means for calculating a first base value and a second base value in accordance with said pixel density detected by said detecting means, said second base value being smaller than said first base value;

selecting means for selecting one of said first base value and said second base value according to an output value of said binarizing means;

error calculation means for calculating a binary error by subtracting from the image data of the incoming target pixel said selected base value; and means for diffusing said calculated error to a peripheral pixel of said incoming target pixel.

10. The image processing apparatus according to claim 9, wherein said first base value is determined based on a pixel density of the image data of an image portion, and said second base value is determined based on a pixel density of the image data of a background portion.

11. An image processing apparatus using an error diffusion binarizing system, said error diffusion system comprising:

means for detecting a density of a plurality of pixels in a predetermined range and a target pixel in an image to be processed;

first calculation means for obtaining a maximum density, a minimum density, and a maximum difference-in-density of said pixels according to the pixel density detected by said detecting means;

second calculation means for calculating a base value according to said maximum density, said minimum density, and said maximum difference-in-density;

third calculation means for calculating a binary error using said calculated base value;

a feedback loop for carrying out feedback of said target pixel according to error data calculated by said third calculation means, and wherein said first calculation means and said second calculation means are provided outside said feedback loop.

12. A method of binarizing multivalue image data by an error diffusion system, comprising steps of:

comparing image data of a target pixel with a predetermined value for binarization;

detecting a maximum value and a minimum value of a pixel density from image data of a plurality of pixels and said target pixel;

calculating a base value in proportion to a difference between said maximum value and said minimum value detected in said detecting step;

calculating an error by subtracting from the image data of said target pixel said calculated base value according to an output value obtained by said comparing step;

diffusing the calculated error to a pixel peripheral to said target pixel; and repeating the above steps with said peripheral pixel as said target pixel.

* * * * *